US008290486B2

(12) United States Patent
Hou et al.

(10) Patent No.: US 8,290,486 B2
(45) Date of Patent: Oct. 16, 2012

(54) METHOD FOR DETERMINING A PRIORITY OF A CALL IN A COMMUNICATIONS NETWORK

(75) Inventors: Jian-Hua Hou, Beijing (CN); Chao Jiang, Beijing (CN)

(73) Assignee: Motorola Mobility LLC, Libertyville, IL (US)

( * ) Notice: Subject to any disclaimer, the term of this patent is extended or adjusted under 35 U.S.C. 154(b) by 171 days.

(21) Appl. No.: 12/679,400

(22) PCT Filed: Oct. 10, 2008

(86) PCT No.: PCT/US2008/079466
§ 371 (c)(1),
(2), (4) Date: Mar. 22, 2010

(87) PCT Pub. No.: WO2009/055256
PCT Pub. Date: Apr. 30, 2009

(65) Prior Publication Data
US 2010/0234020 A1    Sep. 16, 2010

(30) Foreign Application Priority Data
Oct. 26, 2007   (CN) .......................... 2007 1 0167810

(51) Int. Cl.
*H04W 4/00*    (2009.01)
(52) U.S. Cl. .................. 455/432.3; 455/433; 455/432.1; 379/220; 379/208; 379/210
(58) Field of Classification Search ............... 455/432.1, 455/432.3, 433; 379/220.01, 208.01, 210.02
See application file for complete search history.

(56) References Cited

U.S. PATENT DOCUMENTS

| 7,031,703 B1 | 4/2006 | Graf et al. |
| 2005/0181782 A1 | 8/2005 | Hollis et al. |
| 2006/0078105 A1* | 4/2006 | Korn et al. ............... 379/210.02 |
| 2006/0093121 A1* | 5/2006 | Sylvain .................... 379/220.01 |
| 2007/0043558 A1* | 2/2007 | Schwarz et al. ............. 704/207 |
| 2007/0172048 A1* | 7/2007 | Watano .................... 379/208.01 |

FOREIGN PATENT DOCUMENTS

CN   1874539 A   12/2006

OTHER PUBLICATIONS

3GPP TS 23.153 V7.2.0, "3rd Generation Partnership Project; Technical Specification Group Core Network and Terminals; Out of band transcoder control; Stage 2 (Release &)", Mar. 2007, all pages.
State Intellectual Porperty Office of the People'S Republic of China: Notification of the Second Office Action, date of Notification: Nov. 2, 2011, all pages.

* cited by examiner

*Primary Examiner* — David Q Nguyen

(57) ABSTRACT

A method for determining a priority of a call in a communications network as provided enables improved differentiated service to be provided to network subscribers. According to one aspect, the method comprises processing at a callee mobile switching center associated with a callee device an initial address message received from a caller mobile switching center associated with a caller device (step 205). The initial address message comprises a first priority parameter designating a priority status associated with the caller device. Next, the priority of the call is determined at the callee mobile switching center using both the first priority parameter and a second priority parameter designating a priority status associated with the callee device (step 210).

20 Claims, 3 Drawing Sheets

METHOD FOR DETERMINING A PRIORITY OF A CALL IN A COMMUNICATIONS NETWORK

FIELD OF THE INVENTION

The present invention relates generally to communication services in wireless networks, and in particular to determining a priority of a call using priority statuses of both a caller device and a callee device.

BACKGROUND

In some public land mobile networks (PLMNs), such as in a Global System for Mobile (GSM) communications network, calls are routed to mobile phones operating in the network using home location registers (HLRs). The HLRs store data about where in the network a particular mobile phone is operating. When a mobile phone roams to a new radio access network (RAN) node, the phone connects to a mobile switching center (MSC) associated with that RAN node. The MSC identifies the phone and informs an HLR associated with the phone that the phone is now currently in wireless communication with the MSC. If an incoming call directed to the phone is then received in the network, the network first contacts the HLR associated with the phone to learn the identity of the MSC that is currently managing wireless communication with the phone. The incoming call is then routed through the MSC to the phone.

During periods of high network usage, call congestion may require an MSC network to drop (i.e., terminate) some existing calls and/or prevent some new calls from being completed. However, some network operators now offer their subscribers differentiated services in the form of priority services that can enable a particular subscriber to receive priority processing of calls. For example, a subscriber that receives priority services may be guaranteed a particular level of quality of service (QoS) for all calls made from the subscriber's phone. Also, a subscriber that receives priority services may be guaranteed that, during periods of high network usage, non-priority service calls will be dropped before priority service calls. For example, priority services include wireless priority service (WPS), enhanced multi-level precedence and pre-emption service (eMLPP), and circuit switched allocation/retention priority (CARP) service. Priority services can be provisioned using supplementary service (SS) codes, such as defined in the Third Generation Partnership Project (3GPP) technical specification (TS) 29.002.

A priority service status of a subscriber is generally known only within the subscriber's serving MSC. Therefore, for inter-MSC calls, an MSC associated with a caller device may not know the priority service status of a callee device; and, similarly, an MSC associated with a callee device may not know the priority service status of a caller device.

Transcoder free operation (TrFO) concerns the transport of compressed speech, from legacy mobile phones, in a packet transport network through elimination of unnecessary coding and decoding of a call signal by intermediate elements in a bearer path. TrFO uses out of band signaling to determine a negotiated coder-decoder (codec) type to be used at a caller device and a callee device. If the two devices can use compatible codec operations, it may be possible to traverse an entire packet network using only compressed speech from a preferred codec.

However, in an inter-MSC call, when a high-priority services subscriber calls a low-priority services subscriber using TrFO, codec negotiation may result in the use of a codec associated with the low-priority services subscriber. That can be undesirable, as it prevents the network operator for the high-priority services subscriber from being able to guarantee a particular priority service status for inter-MSC calls placed either from or to the high-priority services subscriber.

BRIEF DESCRIPTION OF THE FIGURES

In order that the invention may be readily understood and put into practical effect, reference will now be made to exemplary embodiments as illustrated with reference to the accompanying figures, where like reference numerals refer to identical or functionally similar elements throughout the separate views. The figures together with a detailed description below, are incorporated in and form part of the specification, and serve to further illustrate the embodiments and explain various principles and advantages, in accordance with the present invention where.

Figure 1:
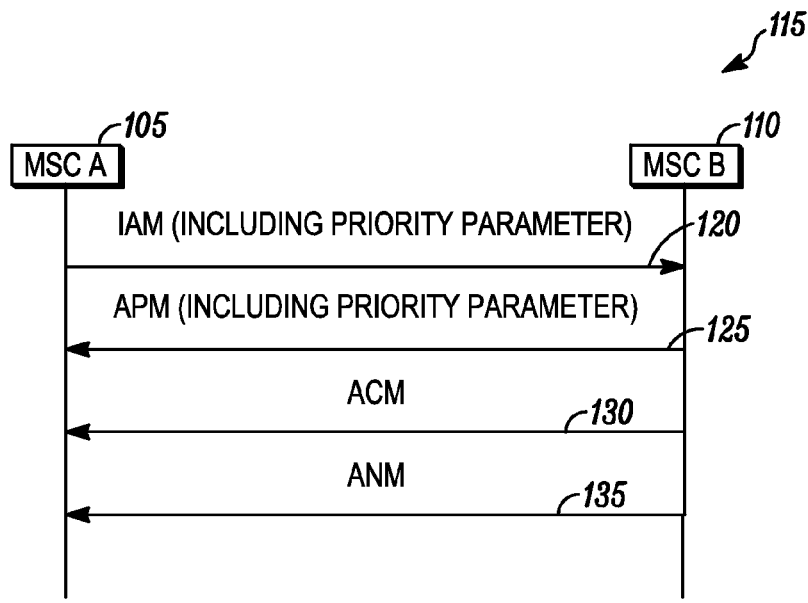
FIG. 1 is a message sequence diagram illustrating a call setup procedure between a first mobile switching center (MSC) "A" and a second MSC "B" operating in a communications network, according to some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and device components related to determining a priority of a call in a communications network. Accordingly, the device components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, front and back, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device. An element preceded by "comprises a . . . " does not, without more constraints, preclude the existence of additional identical elements in the process, method, article, or apparatus that comprises the element.

According to one aspect, the present invention is a method for determining a priority of a call in a communications network from the perspective of a callee mobile switching center. The method comprises: processing at a callee mobile switching center associated with a callee device an initial address message received from a caller mobile switching center associated with a caller device. The initial address message comprises a first priority parameter designating a priority status associated with the caller device. Next, the priority of the call is determined at the callee mobile switching center using both the first priority parameter and a second priority parameter designating a priority status associated with the callee device.

According to another aspect, the present invention is a method for determining a priority of a call in a communications network from the perspective of a caller mobile switching center. The method comprises: processing at a caller mobile switching center associated with a caller device an application transport message received from a callee mobile switching center associated with a callee device. The application transport message comprises a first priority parameter designating a priority status associated with the callee device. Next, the priority of the call is determined at the caller mobile switching center using both the first priority parameter and a second priority parameter designating a priority status associated with the caller device.

Thus, according to the teachings of the present invention, network operators can provide improved differentiated service to network subscribers. Differentiated service can be implemented not just from the perspective of a priority status of one subscriber associated with one mobile switching center (MSC), but also from an end-to-end perspective of the priority statuses of both a caller device and a callee device involved in a multi-MSC call. Thus such differentiated service based on priority statuses of both a caller device and a callee device can be provided even when the caller device and the callee device are operatively connected to different public land mobile networks.

Referring to FIG. 1, a message sequence diagram illustrates a call setup procedure between a first mobile switching center (MSC) "A" 105 and a second MSC "B" 110 operating in a communications network 115, according to some embodiments of the present invention. Consider that a caller "A 1" is associated with the MSC "A" 105, and that a callee "B1" is associated with the MSC "B" 110. After the caller "A 1" indicates to the MSC "A" 105 that the caller "A1" wants to place a call to the callee "B 1", the MSC "A" 105 transmits an initial address message (IAM) 120 to the MSC "B" 110. The IAM 120 comprises a plurality of parameters, as are well known by those having ordinary skill in the art. For example, the IAM 120 may include the following parameters: message type, nature of connection indicators, forward call indicators, calling party's category, transmission medium requirement, called party number, transit network selection, call reference, calling party number, and optional forward call indicators. However, according to the teachings of the present invention, a first priority parameter designating a priority status associated with a caller "A1" device is also included in the IAM 120. For example the first priority parameter can comprise a circuit switched allocation/retention priority (CARP) parameter. The CARP parameter is defined in 3GPP TS 29.002 and corresponds to the allocation/retention priority that is defined in 3GPP TS 23.107.

After receiving and processing the IAM 120, the MSC "B" 110 responds by transmitting an application transport message (APM) 125 to the MSC "A" 105. The APM 125 comprises a plurality of parameters, as are well known by those having ordinary skill in the art. For example, the APM 125 may include the following parameters: message type, message compatibility information, parameter compatibility information, and an application transport parameter. However, according to the teachings of the present invention, a second priority parameter designating a priority status associated with a callee "B1" device is also included in the APM 125. For example the second priority parameter can comprise a CARP parameter, a multilevel precedence and preemption (MLPP) parameter, or a calling or called party's category parameter. Alternatively, the second priority parameter can comprise two, or all three, of these parameters.

As known by those having ordinary skill in the art, an MLPP parameter can be used to assign a priority level to a specific call so that a network handles the call in a predetermined order and time frame. An MLPP parameter also can be used for gaining controlled access to network resources in which calls can be preempted only by higher priority calls, or to indicate that a priority status should be recognized only within a predefined domain.

After a number of the callee "B1" device has been received at the MSC "B" 110, the MSC "B" 110 transmits an address complete message (ACM) 130 back to the MSC "A" 105, and contacts the callee "B1" device. Finally, when the callee "B1" device answers the call, the MSC "B" 110 transmits an answer message (ANM) 135 to the MSC "A" 105.

Below are two examples illustrating advantages of embodiments of the present invention based on the call setup procedure described above in relation to FIG. 1:

EXAMPLE 1

Consider that a second call between a caller "A2", associated with the MSC "A" 105, and a callee "B2", associated with the MSC "B" 110, is also established following the call setup procedure illustrated in FIG. 1. Further, consider that both the MSC "A" 105 and the MSC "B" 110 use CARP to differentiate between subscriber priority statuses. Also consider that callers "A1" and "A2" have the same priority status, that all other calls presently managed by the MSC "A" 105 have a higher priority than callers "A1" and "A2", and that callee "B1" has a higher priority status than callee "B2".

If the MSC "A" 105 subsequently becomes overloaded and needs to drop one call, then the MSC "A" 105 could only randomly select between dropping the call of caller "A1" or the call of caller "A2" if the MSC "A" 105 were not aware of the priority statuses of the callees "B1" and "B2". However, according to the teachings of the present invention, because APMs informed the MSC "A" 105 of the priority statuses of the callees "B1" and "B2", the MSC "A" 105 can intelligently determine that the call of caller "A2" should be dropped first, because callee "B1" has a higher priority status than callee "B2".

EXAMPLE 2

Consider that both the MSC "A" 105 and the MSC "B" 110 support transcoder free operation (TrFO). Further, consider that the caller "A1" has a lower priority status than the callee "B1", such that the caller "A1" is not authorized to use a highest level eight codec rate of an adjustable multi-rate (AMR) codec employed by the MSC "A" 105, but the callee "B1" is authorized to use all eight levels of an AMR codec employed by the MSC "B" 110.

Basic TrFO specifications instruct that codec negotiations between the MSC "A" 105 and the MSC "B" 110 should employ a highest common codec rate available to the caller "A1" and the callee "B1". However, because the MSC "A" 105 was informed of the priority status of the callee "B1" through the APM 125, the MSC "A" 105 will select the highest level eight codec rate authorized for use by the callee "B1".

Figure 2:
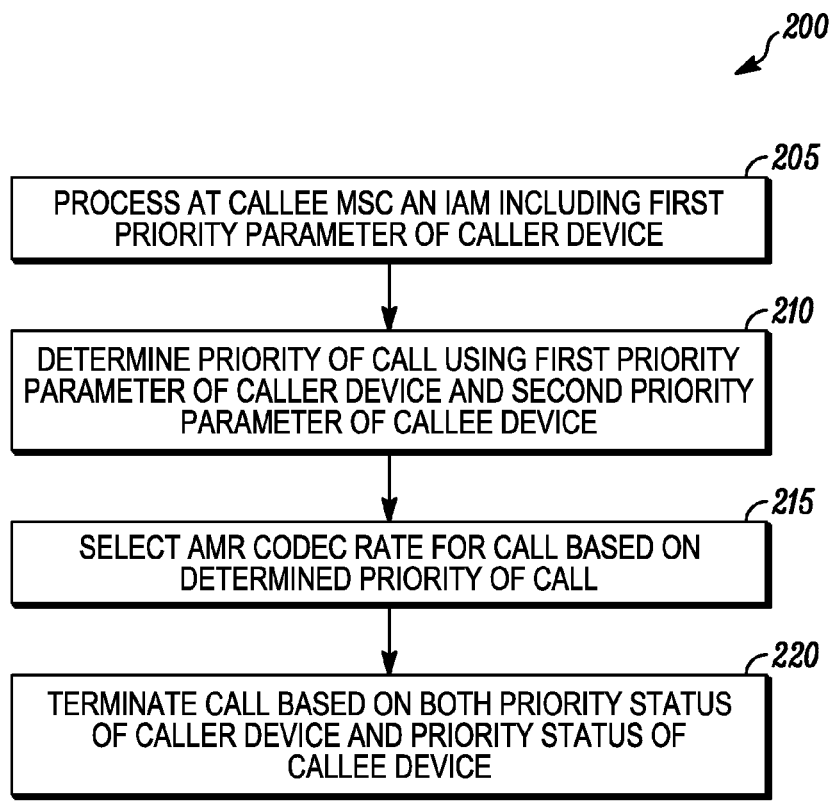
FIG. 2 is a general flow diagram illustrating a method for determining a priority of a call in a communications network from the perspective of a callee mobile switching center, according to some embodiments of the present invention.

Referring to FIG. 2, a general flow diagram illustrates a method for determining a priority of a call in a communications network from the perspective of a callee mobile switching center, according to some embodiments of the present invention. At step 205, a callee mobile switching center associated with a callee device processes an initial address message received from a caller mobile switching center associated with a caller device, wherein the initial address message comprises a first priority parameter designating a priority status associated with the caller device. For example, as described above, the MSC "B" 110 processes the IAM 120 received from the MSC "A" 105, and the IAM 120 includes a first priority parameter designating a priority status associated with a caller "A1" device, such as a CARP parameter.

At step 210, the priority of the call is determined at the callee mobile switching center using both the first priority parameter and a second priority parameter designating a priority status associated with the callee device. For example, the MSC "B" 110 determines a priority of the call by comparing the first priority parameter with a second priority parameter, such as a CARP parameter, an MLPP parameter, or a calling or called party's category parameter.

At step 215, where both the caller mobile switching center and the callee mobile switching center support TrFO, an adaptive multi-rate codec rate is selected for the call based on the determined priority of the call. Finally, at step 220, the call is terminated based on the priority status associated with the caller device and the priority status associated with the callee device. For example, as described above, the MSC "A" 105 terminates a call based on the priority statuses of callers "A1" and "A2" and the priority statuses of callees "B1" and "B2".

Figure 3:
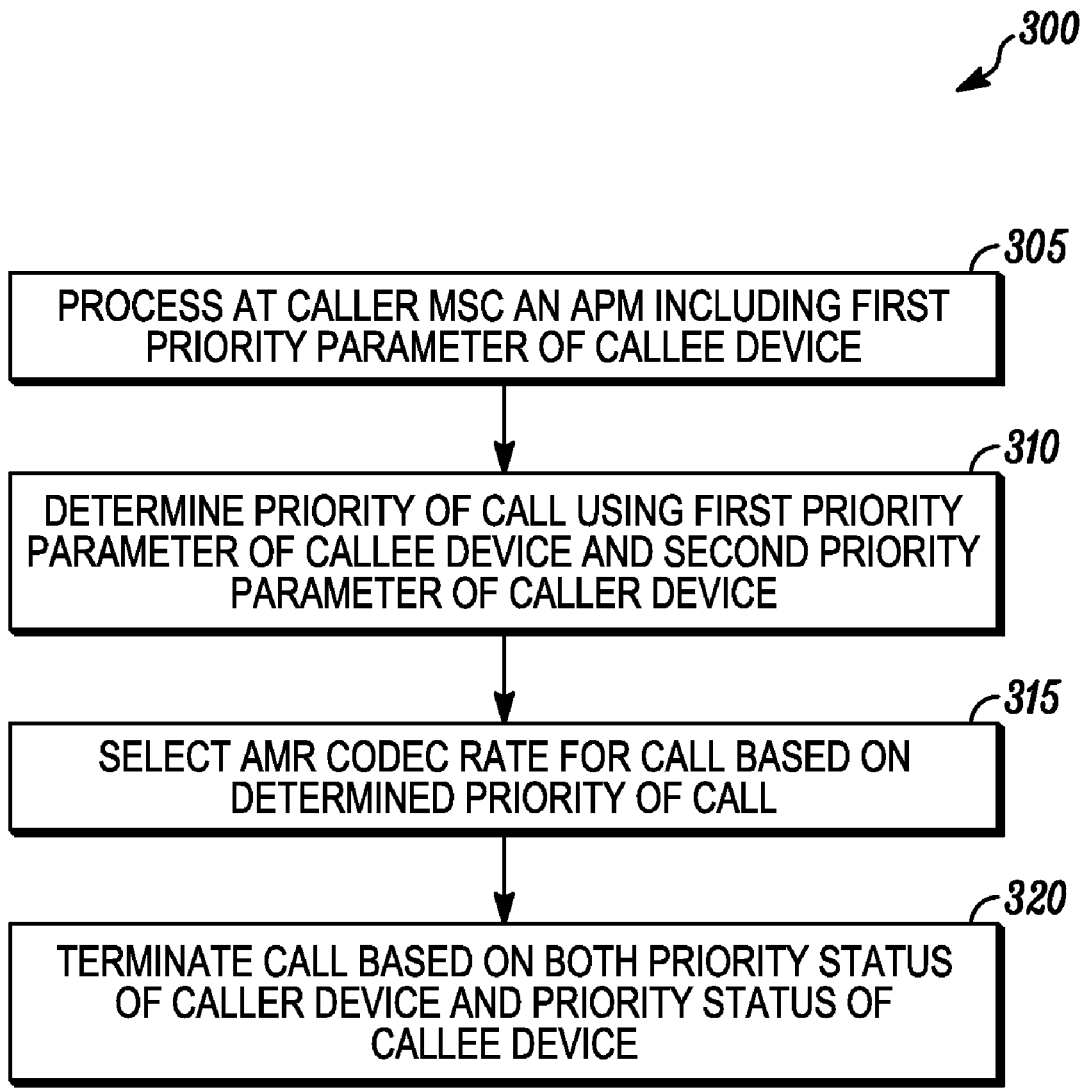
FIG. 3 is a general flow diagram illustrating a method for determining a priority of a call from the perspective of a caller mobile switching center, according to some embodiments of the present invention.

Referring to FIG. 3, a general flow diagram illustrates a method for determining a priority of a call from the perspective of a caller mobile switching center, according to some embodiments of the present invention. At step 305, a caller mobile switching center associated with a caller device processes an application transport message received from a callee mobile switching center associated with a callee device, wherein the application transport message comprises a first priority parameter designating a priority status associated with the callee device. For example, the MSC "A" 105 processes the APM 125 received from the MSC "B" 110.

At step 310, the priority of the call is determined at the caller mobile switching center using both the first priority parameter and a second priority parameter designating a priority status associated with the caller device. For example, the MSC "A" 105 determines the priority of a call using both a priority status associated with a caller "A1" device and a priority status associated with a callee "B1" device.

At step 315, an adaptive multi-rate codec rate for the call is selected based on the determined priority of the call. Finally, at step 320, the call is terminated based on the priority status associated with the caller device and the priority status associated with the callee device.

Figure 4:
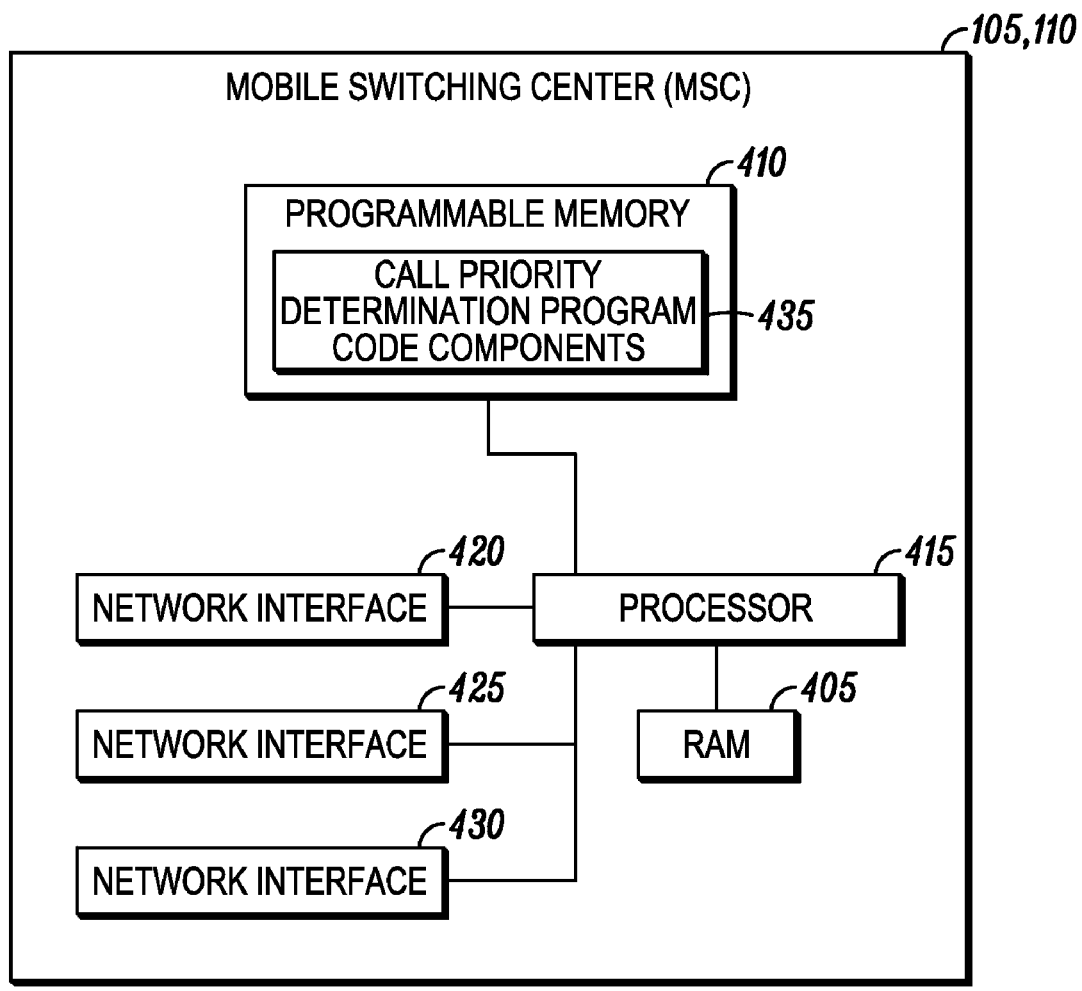
FIG. 4 is a block diagram illustrating system components of a mobile switching center (MSC), according to some embodiments of the present invention.

Referring to FIG. 4, a block diagram illustrates system components of a mobile switching center (MSC), such as the MSC "A" 105 or the MSC "B" 110, according to some embodiments of the present invention. The MSC comprises a random access memory (RAM) 405 and a programmable memory 410 that are coupled to a processor 415.

The processor 415 also has ports for coupling to network interfaces 420, 425, 430, which may be wired or wireless network interfaces. The network interfaces 420, 425, 430 can be used to enable the MSC to communicate with elements in the network 115, such as home location registers (HLRs) and mobile telephones.

The programmable memory 410 can store operating code (OC) for the processor 415 and code for performing functions associated with an MSC. For example, the programmable memory 410 can comprise computer readable program code components 435 configured to cause execution of a method for determining a priority of a call in a communications network, as described herein.

Advantages of some embodiments of the present invention thus include enabling network operators to provide improved differentiated service to network subscribers. Differentiated service can be implemented not just from the perspective of a priority status of one subscriber associated with one mobile switching center (MSC), but also from an end-to-end perspective of the priority statuses of both a caller and a callee involved in a multi-MSC call. Improved quality of service (QoS) therefore can be provided to high-priority network subscribers.

It will be appreciated that embodiments of the invention described herein may be comprised of one or more conventional processors and unique stored program instructions that control the one or more processors to implement, in conjunction with certain non-processor circuits, some, most, or all of the functions of determining a priority of a call in a communications network as described herein. The non-processor circuits may include, but are not limited to, a radio receiver, a radio transmitter, signal drivers, clock circuits, power source circuits, and user input devices. As such, these functions may be interpreted as steps of a method for determining a priority of a call in a communications network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims.

We claim:

1. A method for determining a priority of a first call between a first caller device and a first callee device relative to a second call between a second caller device and a second callee device in a communications network, the method comprising:

processing at a callee mobile switching center associated with the first and the second callee devices a first initial address message received from a first caller mobile switching center associated with the first caller device and a second initial address message received from a second caller mobile switching center associated with the second caller device, wherein the first initial address message comprises a first priority parameter designating a priority status associated with the first caller device and the second initial address message comprises a third priority parameter designating a priority status associated with the second caller device; and determining at the callee mobile switching center the priority of the first call relative to the second call by comparing the first priority parameter with the third priority parameter and a second priority parameter with a fourth priority parameter, wherein the second priority parameter designates a priority status associated with the first callee device and the fourth priority parameter designates a priority status associated with the second callee device.

2. The method of claim 1, wherein the first priority parameter is a circuit switched allocation/retention priority parameter.

3. The method of claim 1, further comprising selecting an adaptive multi-rate codec rate for the call based on the determined priority of the call.

4. The method of claim 1, further comprising terminating the first call based on the priority status associated with the first caller device and the priority status associated with the first callee device.

5. The method of claim 1, wherein transcoder free operation is used between the callee mobile switching center and a caller mobile switching center.

6. The method of claim 1, wherein the first caller device and the first callee device are operatively connected to different public land mobile networks.

7. A method for determining a priority of a call, the method comprising:

processing at a caller mobile switching center associated with a caller device an application transport message received from a callee mobile switching center associated with a callee device, wherein the application transport message comprises a first priority parameter designating a priority status associated with the callee device; and determining at the caller mobile switching center the priority of the call relative to other calls using both the first priority parameter and a second priority parameter designating a priority status associated with the caller device.

8. The method of claim 7, wherein the first priority parameter is a circuit switched allocation/retention priority parameter.

9. The method of claim 8, wherein the application transport message further comprises a called party's category parameter and a multilevel precedence and preemption parameter.

10. The method of claim 7, further comprising selecting an adaptive multi-rate codec rate for the call based on the determined priority of the call.

11. The method of claim 7, further comprising terminating the call based on the priority status associated with the caller device and the priority status associated with the callee device.

12. The method of claim 7, wherein transcoder free operation is used between the callee mobile switching center and a caller mobile switching center.

13. The method of claim 7, wherein the caller device and the callee device are operatively connected to different public land mobile networks.

14. A method for determining a priority of a call in a communications network, the method comprising:

processing at a callee mobile switching center associated with a callee device an initial address message received from a caller mobile switching center associated with a caller device, wherein the initial address message comprises a first priority parameter designating a priority status associated with the caller device;

determining at the callee mobile switching center the priority of the call using both the first priority parameter and a second priority parameter designating a priority status associated with the callee device; and selecting an adaptive multi-rate codec rate for the call based on the determined priority of the call.

15. The method of claim 14, wherein the first priority parameter is a circuit switched allocation/retention priority parameter.

16. The method of claim 14, further comprising terminating the call based on the priority status associated with the caller device and the priority status associated with the callee device.

17. The method of claim 14, wherein transcoder free operation is used between the callee mobile switching center and a caller mobile switching center.

18. The method of claim 14, wherein the caller device and the callee device are operatively connected to different public land mobile networks.

19. A caller mobile switching center comprising:

a network interface;

a processor coupled to the network interface, the processor configured to receive an application transport message from the network interface and from a callee mobile switching center associated with a callee device, wherein the application transport message comprises a first priority parameter designating a priority status associated with the callee device and to determine the priority of the call relative to other calls using both the first priority parameter and a second priority parameter designating a priority status associated with the caller device.

20. A callee mobile switching center associated with a callee device, the callee mobile switching center comprising:

a network interface;

a processor coupled to the network interface, the processor configured (a) to receive an initial address message from the network interface and from a caller mobile switching center associated with a caller device, wherein the initial address message comprises a first priority parameter designating a priority status associated with the caller device, (b) to determine the priority of the call using both the first priority parameter and a second priority parameter designating a priority status associated with the callee device, and (c) to select an adaptive multi-rate codec rate for the call based on the determined priority of the call.

* * * * *